United States Patent
Bailey

(10) Patent No.: US 6,882,589 B2
(45) Date of Patent: Apr. 19, 2005

(54) PREFETCH BUFFER

(75) Inventor: Paul Bailey, Clevedon (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 25 days.

(21) Appl. No.: 10/444,933

(22) Filed: May 23, 2003

(65) Prior Publication Data

US 2004/0042278 A1 Mar. 4, 2004

(30) Foreign Application Priority Data

May 30, 2002 (EP) .............................................. 02253819

(51) Int. Cl.⁷ ................................................ G11C 7/00
(52) U.S. Cl. ............................ 365/230.02; 365/189.02; 365/189.05
(58) Field of Search ....................... 365/189.05, 189.02, 365/189.12, 230.02; 711/118

(56) References Cited

U.S. PATENT DOCUMENTS 4,742,451 A * 5/1988 Bruckert et al. ............. 712/235
5,522,050 A * 5/1996 Amini et al. ................ 710/315
6,237,079 B1 * 5/2001 Stoney ........................ 712/34

FOREIGN PATENT DOCUMENTS

GB 2 193 356 A 2/1988
WO WO 94/08296 A1 4/1994

OTHER PUBLICATIONS

European Search Report from European Patent Application 02253819.3, filed May 30, 2002.

* cited by examiner

*Primary Examiner*—Vu A. Le
(74) *Attorney, Agent, or Firm*—Lisa K. Jorgenson; James H. Morris; Wolf, Greenfield & Sacks, P.C.

(57) ABSTRACT

A computer system comprising a plurality of data processing elements connected through a shared communication bus to a memory so that for a given computer cycle at least one of the elements assumes control of the bus for accessing address in memory. The computer system having memory access circuitry connected between the data processing elements and memory which has first and second buffer units for storing prefetched bursts of data from the memory. The buffer circuit also having control logic for prefetching data in sequential bursts from the memory and storing the prefetched burst in the first or second buffer units and the control logic monitors the buffer units and the address to be accessed in memory to determine in which buffer the next fetched burst should be stored.

19 Claims, 3 Drawing Sheets

PREFETCH BUFFER

BACKGROUND OF THE INVENTION

1. Field of the Invention

The present invention is concerned with a computer system having a memory access circuit between data access circuitry (eg. a processor or similar data consumer) and main memory.

2. Discussion of the Related Art

One of the main restrictions on existing computing architectures and electronic circuits is the speed of read/write accesses to or from memory. Typical modern chipsets have a plurality of circuits connected by a common communication bus which compete for control of that bus to access main memory. The problem is compounded by the long latency exhibited by some memories, which often result in a data request not being completed in the cycles allotted to a requesting device for control of the communications bus.

FIG. 1 shows a system which illustrates this classic problem. A data consumer 2 is issuing read requests to a memory 6 via a common bus resource 4 using a linearly increasing DMA (Direct Memory Access) where each address is one word above the last in memory. The data consumer DMA 2 issues a series of sequential read requests 8 to the memory 6. Each request 8 requires a response (read data) 10 before a new request 8 can be made.

Other data consumers and providers (labelled "other devices" in FIG. 1) compete for the bus resource 4. For the bus resource 4 to be used efficiently, the data consumer 2 should use all the time it locks the bus resource to transfer data. In addition, the data consumer 2 will be more efficient if each word of data requested is returned as quickly as possible to it by the memory. However, the memory 6 has a long latency, and so each read request 8 takes many cycles to complete, thus making the data consumer 2 and bus resource 4 inefficient. In addition, the bus resource 4 may be locked for periods of time by the other devices, so that the data consumer may be starved of data for unacceptable periods.

The data consumer 2 may not be able to perform its function, given the low bandwidth of data it receives as a result of the latency for each read in the DMA.

One possible solution to this problem is to place a cache memory (not shown) at the boundary shown as "X—X" in FIG. 1. As read requests 8 are made, the cache is prefilled and requests can be satisfied directly from the cache. This works well to reduce the latency of the DMA reads and increase peak bandwidth. However, whenever there is a cache miss there will be an interruption while the cache is refilled. Another disadvantage with a cache solution is that it requires a custom silicon memory design.

An alternative known solution would be to use a FIFO (First In First Out) buffer at the boundary shown as "X—X". Again, this allows requests to be satisfied directly from the FIFO, once it is full. However, refilling of the FIFO whenever it is empty introduces an interruption in the data provided.

SUMMARY OF THE INVENTION

An aim of the present invention to increase the bandwidth of data transfer from a high latency memory, particularly for sequential accesses.

According to one aspect of the invention there is provided a memory access circuit for accessing data stored in memory, responsive to requests for data, where each request identifies an address in memory of a data word, the memory access circuit comprising control circuitry for monitoring said requests and prefetching data bursts from memory, each data burst comprising a plurality of data words retrieved from the identified address in memory and a predetermined number of successive addresses; first and second buffer units each capable of receiving at least one of said prefetched data bursts; and switching circuitry connected to said control circuitry and to said first and second buffer units and for selecting whether the prefetched data bursts are stored in said first or second buffer unit, based on information in the request.

Another aspect of the invention provides a method of accessing memory via first and second buffer units, the method comprising: receiving a request for a data word stored at an address in memory; and checking whether the data word at said requested address is held in one of said buffer units, wherein if there is a match, the request is fulfilled by despatching the data word from the corresponding buffer unit, and if there is not a match successive data bursts each comprising a plurality of data words stored at sequential address locations in memory beginning at said requested address are fetched into buffer units, the data burst beginning at the requested address being fetched into the corresponding buffer unit based on information in the request and the successive data burst being fetched into the other buffer unit.

A still further aspect provides a computer system comprising: at least one data processing element connected to a memory and operable to issue requests for data where each request identifies an address in memory of a data word; the computer system further comprising a memory access circuit having control circuitry for monitoring said requests and prefetching data bursts from memory, each data burst comprising a plurality of data words retrieved from the identified address in memory and a predetermined number of successive addresses; first and second buffer units each capable of receiving at least one of said prefetched data bursts; and switching circuitry connected to said control circuitry and to said first and second buffer units and for selecting whether the prefetched data bursts are stored in said first or second buffer unit, based on information in the request.

Control circuitry preferably comprises means for reading identified address and for determining whether the requested data word is stored in one of the buffer units.

In the described embodiment, information in the request comprises a control bit associated with the memory address.

In the embodiment described herein, the least significant bits of the address are used to indicate the location of a data word in the respective first or second buffer unit. In particular, the second, third and fourth least significant bits of the end bit address are used to indicate the location of the requested data word within the respective first or second buffer unit and the fifth least significant bit constitutes the control bit.

The control circuitry can comprise an address store to hold the most significant address bits of the most recently accessed address in memory used to refill the respective one of the first and second buffer units.

The control circuitry can further comprise a comparator arranged to compare the most recently stored address with the corresponding most significant bits of the address identified in each new request, wherein a match indicates that the requested word is stored in one of the first and second buffer units.

For coherency purposes, the control circuitry can comprise a flag associated respectively with each of the first and second buffer units, wherein the flag is set whenever the corresponding buffer unit is filled and is cleared whenever a write request is made to the most recently accessed address in memory.

The control circuitry comprises a grant handshake mechanism whereby a request subsequent to the current request is held off until it can be handled.

BRIEF DESCRIPTION OF THE DRAWINGS

The present invention will now be described by way of an example with reference to the accompanying drawings, in which.

DETAILED DESCRIPTION

Figure 1:
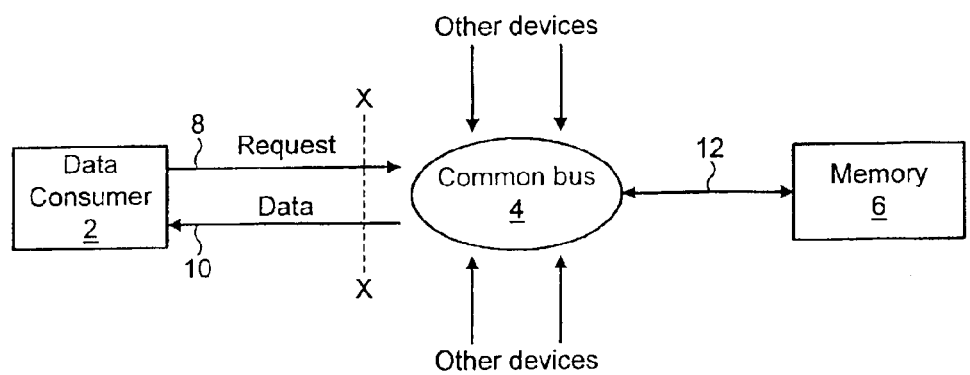
FIG. 1 shows a known system with DMA requests made to memory.
Figure 2:
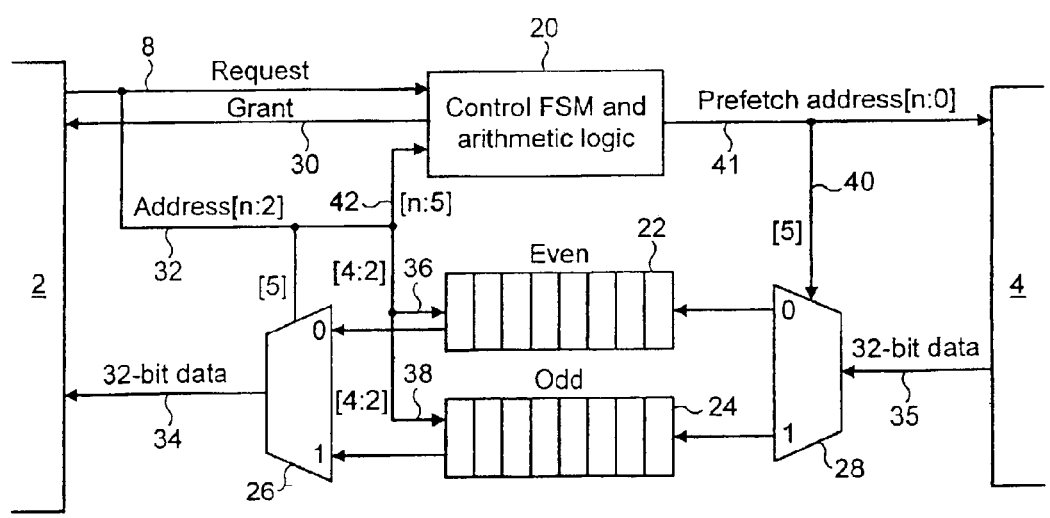
FIG. 2 shows one embodiment of a memory access system according to the present invention.

FIG. 2 shows a memory access circuit according to a preferred embodiment of the present application. The memory access circuit is located on the "X—X" boundary of the system of FIG. 1 and comprises a control unit 20, even and odd storage buffer units 22, 24 and multiplexing circuitry including first and second multiplexers 26, 28. In the preferred embodiment, the even and odd buffer units 22, 24 are each capable of storing eight 32-bit memory words (i.e. 32 bytes of data). The present description concerns the case where data is read from memory sequentially, for example as in graphics application where large amounts of picture data are required to be transferred from memory to a data consumer in the form of a video processing unit. In the described embodiment data is prefetched in bursts of 32 contiguous bytes of data, that is bytes stored at contiguous addresses in main memory. Assume that the buffer units are empty when the data consumer 2 issues its first read request. Because the requested data word is not already stored in the buffer units 22, 24, the control unit 20 sends a prefetch signal on line 41 to memory, with start address [n:0] being the requested data word and being 32 byte aligned. In the present embodiment, the bits 2 to 4 along line 41 are tied to zero, since buffer refills are always done from 32-byte boundaries. In response, the memory returns a linear sequence (burst) of data, which in the preferred embodiment is 32 bytes. One of the buffer units 22, 24 is filled by this burst of prefetched data, depending on the status of address bit [5] as discussed later. When the status of the address bit [5] changes, a second burst of 32 bytes is automatically written into the other buffer unit. The two buffers 22, 24 thus contain copies of two contiguous 32-byte sections of memory and therefore in total 64 bytes of prefetched data are retrieved and stored.

Figure 3:
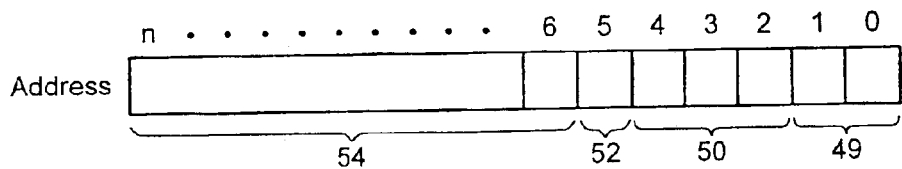
FIG. 3 shows the n-bit address structure.

FIG. 3 shows the addressing scheme used in a preferred embodiment where the least significant bits (LSB) and the most significant bits (MSB) of the address of the requested data are used by the control unit to control the operation of the memory access circuit. More specifically, in this embodiment the bus width for data transfer is 32 bits (i.e. a data word has 4 bytes) as shown along data lines 34 and 35 as shown in FIG. 2. Thus, two bits 49 (bits 0 and 1) can address each of the four bytes within the transferred 32-bit data word. Bits 2 and upwards address different data words, in which three bits 50 (i.e. bits 2 to 4) are used to identify the location of the requested data word within each of the eight storage locations of each buffer unit 22, 24 which may be done for example using a standard binary code as shown in Table 1 below).

TABLE 1

| Location No. | bit 4 | bit 3 | bit 2 |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

In the present embodiment the buffer units hold 32 bytes, which is designed to suit the memory data burst size so that a single bit 52 (i.e. bit 5) naturally selects between either the even buffer unit 22 or the odd buffer unit 24, ($2^5$=32). Thus the fifth LSB[5] 52 identifies whether the data word requested by the data consumer 2 is to be written into or read from the even or odd buffer unit 22 or 24. More specifically, if the fifth bit 52 has a value of "0" then the requested data word is held in the even buffer 22, whereas if the fifth bit has a value of "1" then the requested data word is held in the odd buffer 24. Also, the fifth bit [5] controls the multiplexer 28 for selecting whether to write the data burst prefetched from memory into either the even or odd buffer unit 22 or 24. That is, when the fifth bit 52 has a value of "0" multiplexer 28 selects data to be written into the odd buffer unit 22, whereas when the fifth bit has a value of "1" the multiplexer is controlled so that data is instead written into the even buffer unit 24.

Figure 4:
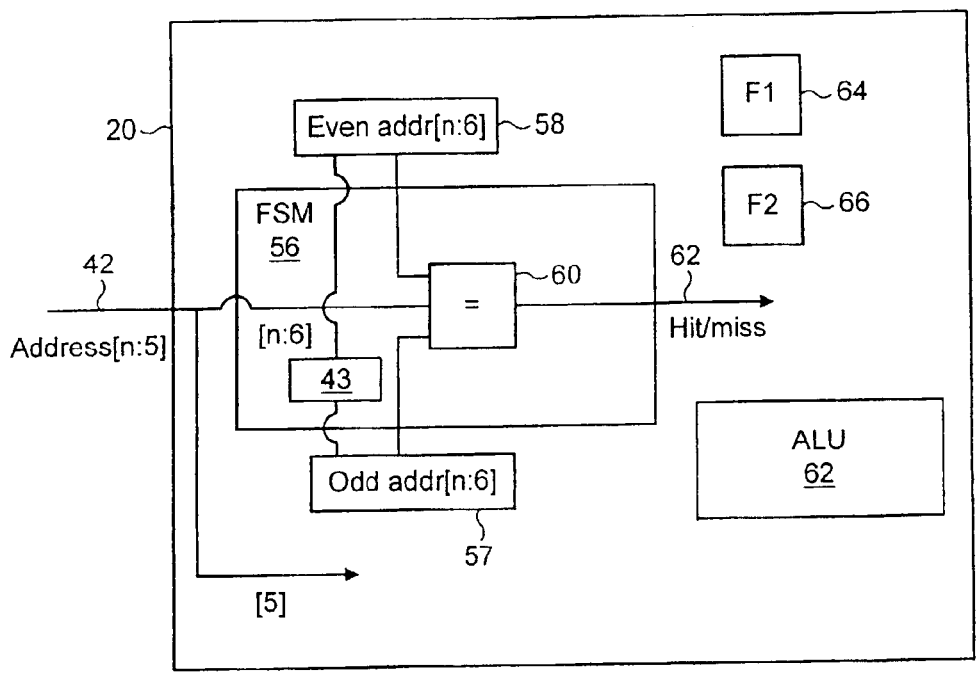
FIG. 4 shows a preferred embodiment of the control unit of the present application.

FIG. 4 shows a preferred embodiment of the control unit 20 where address bits six to n (54) are compared by comparator 60 to the corresponding bits of the most recent address to be accessed in memory for refilling the even and odd buffers 22, 24. More specifically, the most recently accessed address in memory used to refill the even buffer unit 22 is held in a first data store 58 within the control unit 20. Also, the most recently accessed in memory used to refill the odd buffer unit 24 is held in a second data store 57 within the control unit 20. The control unit 20 is shown to comprise a FSM (Finite State Machine) 56, a first data store 58, a second data store 57, an ALU (Arithmetic Logic Unit) 62 and two data flags 64, 66. The finite state machine (FSM) 56 provides the logic for controlling the operations of the memory access circuit and may be implemented using either software or hardware.

When a DMA read request 8 for a data word stored in memory is issued by the data consumer 2, its address is supplied to the control unit. The comparator logic 60 will compare the corresponding bits of the incoming address with those in the first and second data store 58, 57. If there is a match then a hit signal on line 68 is provided indicating that the data word can be accessed from the buffers instead of memory. In a preferred embodiment, the fifth least significant bit [5] of the read request address selects which store 57, 58 to compare the address with in determining whether there is a hit. Then, the relevant data is located in the correct one of the even and odd buffer unit 22 or 24 using the second, third and fourth least significant bits [4:2] to define its location in the correct buffer unit and the requested data word is sent back to the DMA consumer along line 34 via the multiplexer 26. The multiplexer 26 uses the fifth least significant bit [5] of the address to select the correct one of the even 22 or odd buffer unit 24. In this embodiment, the writing of data fetched from memory into the even and odd buffer units 22, 24 is handled by a simple 3-bit binary counter 43 (i.e. for addressing the eight 32-bit data word locations), which can be shared between the two buffer units.

Figure 5:
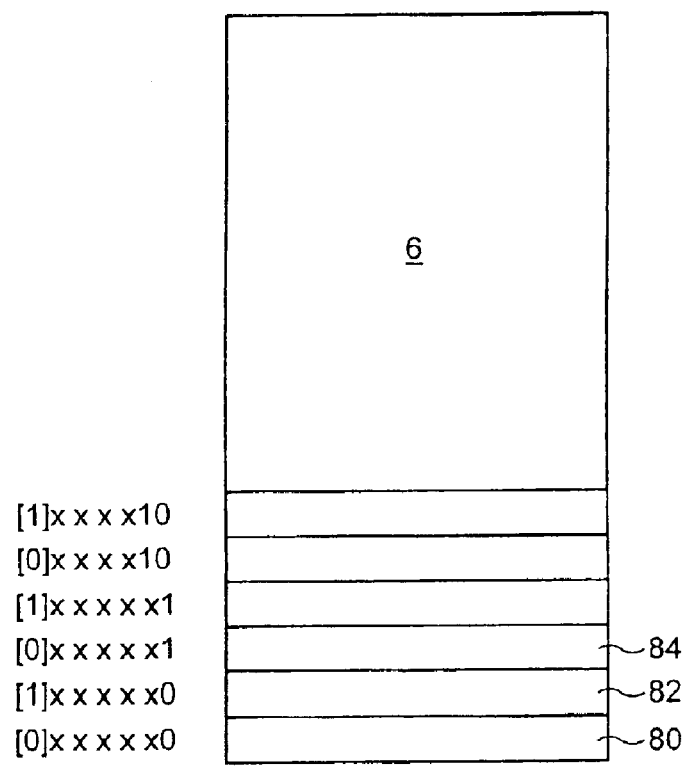
FIG. 5 shows one embodiment of memory addressing according to the present invention.

If the control unit 20 finds that the comparison between the requested address and the most recently accessed address do not match, then a miss signal along line 68 is generated. As a result of this miss signal, the FSM (Finite State Machine) will send a prefetch request to main memory for the next 64 bytes of data which would include the requested 32-bit data word. These 64 bytes would be written into the even and odd buffer units as two 32-byte data bursts as described above. In more detail, FIG. 5 shows one embodiment of the memory 6 where each 32-bit data word is assigned a certain memory address in memory 6. A request from a data consumer 2 will contain the requested address, if the control unit 20 determines a miss, the fifth to nth most significant bits of the address of the requested data word are sent with the prefetch signal along line 41 to memory 6. The fifth bit of the address determines the start address of the data burst to be fetched from memory and also determines, by controlling the multiplexer along line 40, which of the respective buffer units 22, 24 will be filled with the first data burst fetched from memory 6. As can be seen from FIG. 5, the base address 80 and the next address 82 in memory 6 have the same address bit [6:n], but differ in that the fifth address bit of the base memory address 80 is "0" whereas it is "1" for the next address 82.

In addition to prefetching data, the control unit 20 monitors the DMA read request address with the intention of prefetching data from memory into the buffer in advance of the data being needed. In a preferred embodiment an algorithm for doing this will be implemented within the FSM 56 using the following pseudo-code.

```
if (DMA read request address[5] just changed '0' to '1') and
(this read is a hit) then
        fill even buffer with 32 bytes from address where:
            bits [n:6] = incoming read request address[n:6] + '1'
            bit[5] = '0'
    else if (DMA read request address[5] just changed '1' to '0') and
(this read is a hit) then
        fill odd buffer with 32 bytes from address where:
            bits [n:6] = incoming read request address[n:6]
            bit[5] = '1'
    else if (this read is a miss) then
        if (read request address [5] = '0') then
            fill even buffer with 32 bytes from address where:
                bits [n:6] = incoming read request address[n:6]
                bit[5] = '0'
            fill odd buffer with 32 bytes from address where:
                bits [n:6] = incoming read request address[n:6]
                bit[5] = '1'
        else
            fill even buffer with 32 bytes from address where:
                bits [n:6] = incoming read request address[n:6] + 1
                bits[5] = '0'
            fill odd buffer with 32 bytes from address where:
                bits [n:6] = incoming read request address[n:6]
                bit[5] = '1'
    else
            no refill requests to send
```

The algorithm is suitable for implementation in hardware by using an adder and an equality comparator, which means a simple implementation on silicon using a smaller amount of silicon area then that taken up by more complex circuitry required of other solutions. In a preferred embodiment, the adder (not shown in FIG. 4) is implemented in the ALU 62, while the comparator 60 is implemented in the FSM logic 56.

The effect of the algorithm is to cause the control unit 20 to monitor the status of the fifth bit of the read request address from the data consumer and to monitor whether the read request address is a hit, i.e. if the requested data word resides within one of the buffers 22, 24. The algorithm monitors the read request address to detect when the fifth bit has "just changed" AND the request is still a hit, which indicates that the next data word to be read is in the other buffer (probably at the start in the case of sequential DMA reads). If the fifth bit had just changed from a "0" to a "1" this indicates that the next data word to be read is in the odd buffer 24 and that the data consumer has just finished reading from the even buffer 22. In this case, if one assumes that the next few address requests are sequential and that the next few data words are to be read from the odd buffer, then while the odd buffer is being read the even buffer will be refilled. That is, before the even buffer is refilled, the address held in data store 58 is incremented by 1 by an adder so that the new address is used directly as the refill request address thereby updating the most recent address in main memory to be accessed. Also, the fifth bit is set to "0" so that multiplexer 28 is controlled to allow the prefetched data from memory to fill the even buffer 22. A similar operation is performed when the fifth bit has just changed from "1" to "0" indicating a change from reading from the odd buffer 24 to the even buffer 22. However, since the present embodiment is concerned with ascending sequential accesses from memory, the next odd address for refilling the odd buffer unit 24 is inherently specified by the fifth bit being a '1' and therefore the address does not need to be incremented by 1 as above. In this way, the purpose of this algorithm is achieved by refilling one buffer while data is being read from the other buffer and so ensuring that an incrementing DMA data consumer 2 always has the data it requires.

The algorithm then shows that if the read is a miss (as described above) then two bursts of contiguous data (each of 32 bytes) including the requested data word (32-bit) need to be prefetched from memory into the corresponding even and odd buffers. More specifically, if the read is a miss but the fifth least significant bit 52 of the read request address is a '0', then the even buffer is first filled by the requested 32 byte data burst from memory followed by the odd buffer before filled with the odd portion of the requested address. The penultimate ELSE statement in the algorithm takes into account the situation when it is necessary to fill the odd buffer unit first. In that case, it is necessary to increment the requested even address so that the even buffer unit 22 is filled with the even portion of the next address in memory. After each memory location has been accessed the corresponding first and second data stores 57,58 are set to that address.

If none of the aforementioned conditions in the algorithm occur, the final ELSE statement indicates that no other refill requests are sent. In other words, the data reads from the data consumer 2 are satisfied with the current contents of the buffer units 22, 24.

Moreover, the control unit 20 of the memory access circuit uses a "grant handshake" mechanism where a grant signal is only sent along line 30 to the data consumer 2 when the requested data is available. In this way, the DMA read request is held off until it can be satisfied resulting in reduced interruption for the data consumer 2.

The present invention is concerned with data reads from memory, however other devices connected to the bus are capable of writing data to the memory 6 and therefore it is necessary to provide a mechanism for maintaining coherency between the prefetched data in the buffer units 22, 24 and memory 6. This is accomplished using the two "valid" flags 64, 66 shown in the control unit 20 of FIG. 4, each of which can invalidate the corresponding buffer unit if the address being written to in memory 6 has been pre-fetched. These flags are implemented in a preferred embodiment using two single-bit registers, in which valid flag 64 corresponds to the even buffer unit and valid flag 66 corresponds to the odd buffer unit. The flags are set (i.e. "1") thereby validating the relevant buffer unit 22, 24 whenever a relevant buffer unit 22, 24 has been filled from memory 6. However, a DMA (or other) write request to an address in memory will clear the relevant valid flag i.e. set the relevant register 62, 64 to '0') if the most significant bits [n:6] of the address corresponds to the data bursts in the respective even or odd buffer units 22, 24. Since read and write access cannot occur simultaneously, the comparison can be implemented using the same comparator circuitry 60 shown in FIG. 4. More specifically, the write address can be compared with the most recent addresses accessed from memory held in either of the first and second data stores 57, 58 and if either of these match then there is a hit and the relevant flag 62, 64 will be cleared thereby invalidating the corresponding buffer unit. In this way during a read operation, the control unit 20 is able to bypass reading from the cache buffer units in case incoherent data is present so that if one of the valid flags 64, 66 is clear then any attempt to read that buffer will be classed as a "miss" and a refill request for 2×32 bytes at that address will be issued directly to memory 6 causing both buffers to be refilled. In other words, for a valid read request and for maintaining coherency, in effect a "hit" is defined as:

Hit=(DMA read request address[5]='0' AND DMA read request address[n:6]=last fetched address for Even buffer[n:6] AND Valid Flag 64='1')

OR (DMA read request address[5]='1' AND DMA read request address[n:6]=last fetched address for Odd buffer[n:6] AND Valid flag 66='1')

Furthermore, another device that is capable of modifying the memory 6, for example a CPU, can directly modify the valid flags 64, 66 to force a re-fetch of any data stored in either the even or odd buffer units 22, 24.

It should be appreciated that the memory access circuit of the present application is located on the boundary "X—X" (see FIG. 1), which means that the prefetching of data from memory over the control bus can be done whenever the bus and memory allow this. Also, it might be expected that the interface between the data consumer 2 and memory access device will be more demanding on the bandwidth then the interface between the memory access device and memory in the sense that DMA read requests needs to be satisfied as soon as possible to prevent bottlenecks for the data consumer 2 and often the interface between the memory access circuit and memory 6 will be less demanding in view of the latency of memory and data is prefetched from memory into the buffer units in anticipation of the read request from the data consumer 2 and not necessarily having the same real-time requirements of the data consumer interface. In any event, the control unit monitors whether the requested data is available within the buffer units and if not, a grant signal is not issued on line 30 so that the data consumer is made aware that the requested data is being prefetched and is not immediately available.

It should be appreciated that in an alternative embodiment, the same addressing principles as shown in FIG. 3 can be applied to scale the addressing system if required. There is no reason why the data bus width needs to be 32-bits. For example, if a 64-bit data bus width is chosen then bit 2 of the address would be used at the byte-addressing level since three of the least significant bits would be used to address each of the eight bytes in the data word. Also, there is no reason why the buffer units 22, 24 have to be 32 bytes. In alternative embodiments, if 16 byte buffers were used bit 4 would be the buffer unit selection bit 52 (i.e. $2^4$), whereas if 64 byte buffers were chosen bit 6 would be buffer unit selection bit (i.e. $2^6$), etc.

Also, it should be appreciated that while the embodiment described herein relates primarily to sequential accesses from ascending locations in memory, in an alternative embodiment, the present invention can be used to handle descending sequential accesses as well.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A memory access circuit for accessing data stored in memory responsive to requests for data where each request identifies an address in memory of a data word, the memory access circuit comprising:

control circuitry for monitoring said requests and prefetching data bursts from memory, each data burst comprising a plurality of data words retrieved from the identified address in memory and a predetermined number of successive addresses;

first and second buffer units each capable of receiving at least one of said prefetched data bursts; and switching circuitry connected to said control circuitry and to said first and second buffer units and for selecting whether the prefetched data bursts are stored in said first or second buffer unit, based on information in the request.

2. The memory access circuit according to claim 1, wherein the control circuitry comprises means for reading the identified address and for determining whether the requested data word is stored in one of said buffer units.

3. The memory access circuit according to claim 1, wherein the information in the request comprises a control bit associated with the memory address.

4. The memory access circuit according to claim 1, wherein the least significant bits of the address are used to indicate the location of a data word in the respective first or second buffer unit.

5. The memory access circuit according to claim 4, wherein the second, third and fourth least significant bits of the address are used to indicate the location of the requested data word within the respective first or second buffer unit and the fifth least significant bit constitutes the control bit.

6. The memory access circuit according to claim 1, wherein the control circuitry comprises an address store to hold the most significant address bits of the most recently accessed address in memory used to refill the respective one of the first and second buffer units.

7. The memory access circuit according to claim 6, wherein the control circuitry comprises a comparator arranged to compare the most recently stored address with the corresponding most significant bits of the address identified in each new request, wherein a match indicates that the requested data word is stored in one of the first and second buffer units.

8. The memory access circuit according to claim 6, wherein the control circuitry comprises a flag associated respectively with each of the first and second buffer units, wherein the flag is set whenever the corresponding buffer unit is filled and is cleared whenever a write request is made to the most recently accessed address in memory.

9. A memory access circuit according to claim 1, wherein the control circuitry comprises a grant handshake mechanism whereby a request subsequent to the current request is held off until it can be handled.

10. A method of accessing memory via first and second buffer units, the method comprising:

receiving a request for a data word stored at an address in memory; and checking whether the data word at said requested address is held in one of said buffer units, wherein if there is a match, the request is fulfilled by dispatching the data word from the corresponding buffer unit, and if there is not a match successive data bursts each comprising a plurality of data words stored at sequential address locations in memory beginning at said requested address are fetched into buffer units, the data burst beginning at the requested address being fetched into the corresponding buffer unit based on information in the request and the successive data burst being fetched into the other buffer unit.

11. The method of accessing memory according to claim 10, wherein if there is a match then the data word is retrieved from the first and second buffer units based on information in the request.

12. The method of accessing memory according to claim 10, wherein if there is a match and information in the request indicates that the data word to be accessed has an address which has just changed from an address of a data word held in the first buffer unit to the address of a data word held in the second buffer unit then while the data word is being retrieved from the second buffer unit the first buffer unit is filled with the next data burst from memory and vice versa when the information in the request indicates that the data to be accessed has just changed from the second buffer unit to the first.

13. The method of accessing memory according to claim 10, wherein the information in the request comprises a control bit associated with the memory address.

14. The method of accessing memory according to claim 10, wherein the least significant bits of the requested address are used to indicate the location of a data word in the respective first or second buffer unit.

15. The method of accessing memory according to claim 14, wherein the second, third and fourth least significant bits of the address are used to indicate the location of the requested data word within the respective first or second buffer unit and the fifth least significant bit constitutes the control bit.

16. The method of accessing memory according to claim 10, which comprises the step of holding the most significant address bits of the most recently accessed address in memory, which was used to refill the respective one of the first and second buffer units.

17. The method of accessing memory according to claim 16, wherein a flag is associated respectively with each of the first and second buffer units for maintaining valid data for read and write requests made to memory, wherein said flag is set whenever the corresponding buffer unit is filled and is cleared whenever a write request is made to the most recently accessed address in memory.

18. The method of accessing memory according to claim 17, wherein an indication of a match is not given if the status of said flag is clear even if the most significant address bits of the most recently accessed address do correspond to the most significant bits of the requested address.

19. A computer system comprising:

at least one data processing element connected to a memory and operable to issue requests for data where each request identifies an address in memory of a data word;

the computer system further comprising a memory access circuit having:

control circuitry for monitoring said requests and prefetching data bursts from memory, each data burst comprising a plurality of data words retrieved from the identified address in memory and a predetermined number of successive addresses;

first and second buffer units each capable of receiving at least one of said prefetched data bursts; and switching circuitry connected to said control circuitry and to said first and second buffer units and for selecting whether the prefetched data bursts are stored in said first or second buffer unit, based on information in the request.

* * * * *

UNITED STATES PATENT AND TRADEMARK OFFICE
CERTIFICATE OF CORRECTION

PATENT NO. : 6,882,589 B2
DATED : April 19, 2005
INVENTOR(S) : Paul Bailey

It is certified that error appears in the above-identified patent and that said Letters Patent is hereby corrected as shown below:

Column 5,
Lines 58-60, should read -- bit[5] = '0' --.

Signed and Sealed this

Sixteenth Day of August, 2005

JON W. DUDAS
*Director of the United States Patent and Trademark Office*